United States Patent
Choi

(10) Patent No.: US 9,928,875 B2
(45) Date of Patent: Mar. 27, 2018

(54) EFFICIENT VIDEO ANNOTATION WITH OPTICAL FLOW BASED ESTIMATION AND SUGGESTION

(71) Applicant: NEC Laboratories America, Inc., Princeton, NJ (US)

(72) Inventor: Wongun Choi, Lexington, MA (US)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 15/374,758

(22) Filed: Dec. 9, 2016

(65) Prior Publication Data
US 2017/0278544 A1 Sep. 28, 2017

Related U.S. Application Data

(60) Provisional application No. 62/311,518, filed on Mar. 22, 2016.

(51) Int. Cl.
*H04N 9/80* (2006.01)
*G11B 27/031* (2006.01)
(Continued)

(52) U.S. Cl.
CPC ........ *G11B 27/031* (2013.01); *G06F 3/04842* (2013.01); *G06K 9/00577* (2013.01);
(Continued)

(58) Field of Classification Search
CPC ............ G06F 3/04842; G06K 9/00577; G06T 11/203; G06T 11/60; G11B 27/28; G11B 27/34
(Continued)

(56) References Cited

U.S. PATENT DOCUMENTS

2014/0023341 A1* 1/2014 Wang ................ H04N 9/87
386/240
2016/0132728 A1* 5/2016 Choi .................. G06K 9/6215
382/103
(Continued)

OTHER PUBLICATIONS

Russakovsky, et al., "ImageNet Large Scale Visual Recognition Challenge", arXiv, Jan. 2015, pp. 1-43.
(Continued)

*Primary Examiner* — Helen Shibru
(74) *Attorney, Agent, or Firm* — Joseph Kolodka

(57) ABSTRACT

A computer-implemented method is provided for video annotation of a video sequence that includes a plurality of frames. The method includes storing, by a computer, information representative of a bounding box around a given target object in the video sequence in both a first frame and a last frame of the video sequence that include the target object. The method further includes generating, by the computer based on the information, estimated box annotations of the given target object in suggested frames from among the plurality of frames. The suggested frames are determined based on an annotation uncertainty measure calculated using a set of already provided annotations for at least some of the plurality of frames together with optical flow information for the video sequence. The method also includes displaying, by the computer, various ones of the estimated box annotations of the given target object in the suggested frames.

20 Claims, 5 Drawing Sheets

(51) Int. Cl.
  *G11B 27/28*   (2006.01)
  *G06T 11/60*   (2006.01)
  *G11B 27/34*   (2006.01)
  *G06K 9/00*    (2006.01)
  *G06T 11/20*   (2006.01)
  *G06F 3/0484*  (2013.01)

(52) U.S. Cl.
  CPC ............ *G06T 11/203* (2013.01); *G06T 11/60* (2013.01); *G11B 27/28* (2013.01); *G11B 27/34* (2013.01); *G06T 2207/10016* (2013.01)

(58) Field of Classification Search
  USPC .................................................. 386/239, 230
  See application file for complete search history.

(56) References Cited

U.S. PATENT DOCUMENTS

| | | | | |
|---|---|---|---|---|
| 2016/0140400 | A1* | 5/2016 | Chandraker | G06K 9/00785 348/149 |
| 2017/0116748 | A1* | 4/2017 | Scutaru | G06T 7/143 |
| 2017/0124409 | A1* | 5/2017 | Choi | G06N 3/0454 |
| 2017/0124415 | A1* | 5/2017 | Choi | G06N 3/08 |
| 2017/0200061 | A1* | 7/2017 | Julian | G06K 9/6202 |
| 2017/0243083 | A1* | 8/2017 | Wang | G06K 9/00711 |
| 2017/0255832 | A1* | 9/2017 | Jones | G06K 9/00771 |
| 2017/0262996 | A1* | 9/2017 | Jain | G06T 7/0087 |
| 2017/0316777 | A1* | 11/2017 | Perez | G06F 17/279 |

OTHER PUBLICATIONS

Russel, et al., "LabelMe: A Database and Web-Based Tool for Image Annotation", International Journal of Computer Vision, May 2008, pp. 157-173, vol. 77, Issue 1-3.

Vondrick, et al., "Efficiently Scaling Up Crowdsourced Video Annotation A Set of Best Practices for High Quality, Economical Video Labeling", International Journal of Computer Vision manuscript, Oct. 2011, pp. 1-22.

* cited by examiner

EFFICIENT VIDEO ANNOTATION WITH OPTICAL FLOW BASED ESTIMATION AND SUGGESTION

RELATED APPLICATION INFORMATION

This application claims priority to U.S. Provisional Pat. App. Ser. No. 62/311,518 filed on Mar. 22, 2016, incorporated herein by reference in its entirety.

BACKGROUND

Technical Field

The present invention relates to video processing and more particularly to efficient video annotation with optical flow based estimation and suggestion.

Description of the Related Art

Recent approaches in object annotation are primarily implemented on a web-based system in order to crowdsource the annotation jobs. For instance, the popular ImageNet dataset is annotated using a web-based annotation system that is deployed over the Amazon Mechanical Turk® where many workers around the world can contribute to the annotation process. The MIT Labelme dataset is also annotated using a similar web-based annotation system. However, both of the systems are focused on single image annotation where no temporal consistency or motion information is available. On the other hand, the Video Annotation Tool from Irvine, Calif. (VATIC) focuses on the problem of bounding box annotation in videos. The system is implemented using a GUI based annotation tool where workers can specify the target object type, draw boxes to annotate an object, and provide properties of the object if it is requested. In order to expedite the annotation process, the tool provides automatic box annotations in between manually annotated frames by using a simple linear interpolation. For example, if an object 1 has a manual box annotation at time frame 1 and time frame 10, all the boxes in frames from 2 to 9 are automatically generated by a linear interpolation process. However, VATIC at least suffers from being overly complex in its use of linear interpolation.

Thus, there is a need for an efficient video annotation system.

SUMMARY

According to an aspect of the present invention, a computer-implemented method is provided for video annotation of a video sequence that includes a plurality of frames. The method includes storing, by a computer, information representative of a bounding box around a given target object in the video sequence in both a first frame and a last frame of the video sequence that include the target object. The method further includes generating, by the computer based on the information, estimated box annotations of the given target object in suggested frames from among the plurality of frames. The suggested frames are determined based on an annotation uncertainty measure calculated using a set of already provided annotations for at least some of the plurality of frames together with optical flow information for the video sequence. The method also includes displaying, by the computer, various ones of the estimated box annotations of the given target object in the suggested frames.

According to another aspect of the present invention, a computer program product is provided for video annotation of a video sequence that includes a plurality of frames. The computer program product includes a non-transitory computer readable storage medium having program instructions embodied therewith. The program instructions are executable by a computer to cause the computer to perform a method. The method includes storing information representative of a bounding box around a given target object in the video sequence in both a first frame and a last frame of the video sequence that include the target object. The method further includes generating, based on the information, estimated box annotations of the given target object in suggested frames from among the plurality of frames. The suggested frames are determined based on an annotation uncertainty measure calculated using a set of already provided annotations for at least some of the plurality of frames together with optical flow information for the video sequence. The method also includes displaying various ones of the estimated box annotations of the given target object in the suggested frames.

According to yet another aspect of the present invention, a computer processing system is provided for video annotation of a video sequence that includes a plurality of frames. The computer processing system includes a memory configured to store information representative of a bounding box around a given target object in the video sequence in both a first frame and a last frame of the video sequence that include the target object. The computer processing system further includes a processor configured to generate, based on the information, estimated box annotations of the given target object in suggested frames from among the plurality of frames. The suggested frames are determined based on an annotation uncertainty measure calculated using a set of already provided annotations for at least some of the plurality of frames together with optical flow information for the video sequence. The computer processing system also includes a display device configured to display various ones of the estimated box annotations of the given target object in the suggested frames.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to efficient video annotation with optical flow based estimation and suggestion.

In an embodiment, a new web-based system is provided to efficiently annotate objects as bounding boxes in long video sequences. Object box annotations are valuable resources to train a robust and accurate visual recognition system. However, annotating objects in videos requires an extensive amount of manual labor, which can take months and a high amount of other related costs. Accelerating the annotation process can reduce the operation cost significantly and help to quickly develop an accurate recognition system. In an embodiment, the present invention exploits temporal consistency in object motion as well as optical flow information in order to obtain a large number of bounding box annotations with a minimal amount of manual labor.

In an embodiment, the present invention uses a web-based GUI annotation system. However, unlike VATIC, the present invention (1) uses optical flows to better localize the bounding boxes and (2) suggests the best frame to be annotated in order to minimize the required amount of manual interaction.

The present invention computes the optical flow of the video sequence and automatically estimates the box location in between annotation frames using the flow information with a Kalman Filtering (linear quadratic estimation) algorithm. The present invention can provide far better estimation of the bounding boxes than linear interpolation, especially when targets' motions are complicated (non-linear).

In VATIC, users have full freedom on which frames need to be annotated. Some users may choose to annotate every frame in a sequential manner, which requires much more time than necessary. Another simple alternative strategy might be annotating every N-th frame. This strategy will reduce the required cost/time by N times. However, the quality of annotations might be inferior as compared to the "every frame annotation" case. Moreover, the quality of annotation might be not acceptable when a target object undergoes nonlinear motion in a certain period of time, where more annotations are required. The present invention automatically calculates the uncertainty of the annotation in unlabeled frames, and suggests the best annotation frame to the users so as to minimize the annotation loss globally (that is, across an entire video sequence).

Figure 1:
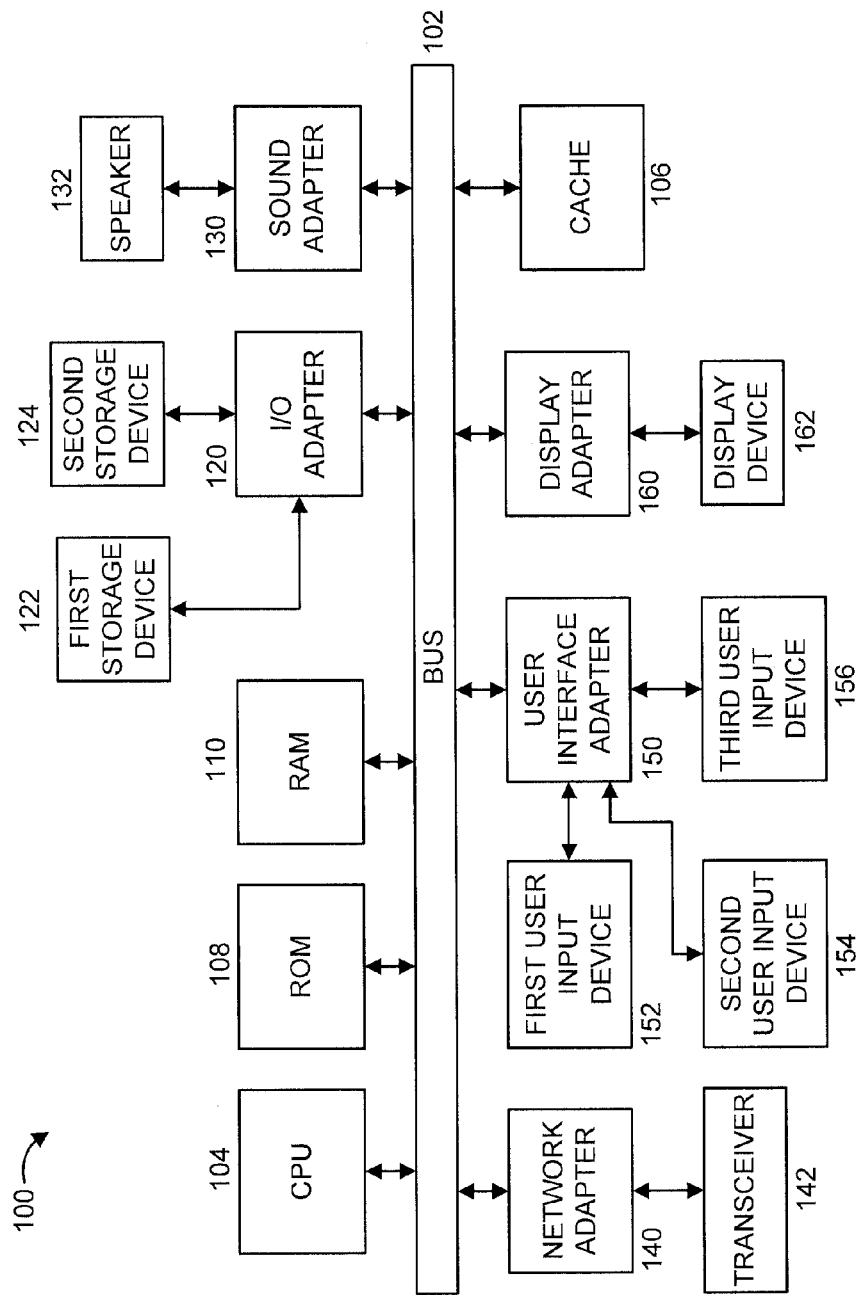
FIG. 1 shows a block diagram of an exemplary processing system 100 to which the present invention may be applied, in accordance with an embodiment of the present invention.

FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. The speaker 132 can be used to provide an audible alarm or some other indication relating to resilient battery charging in accordance with the present invention. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
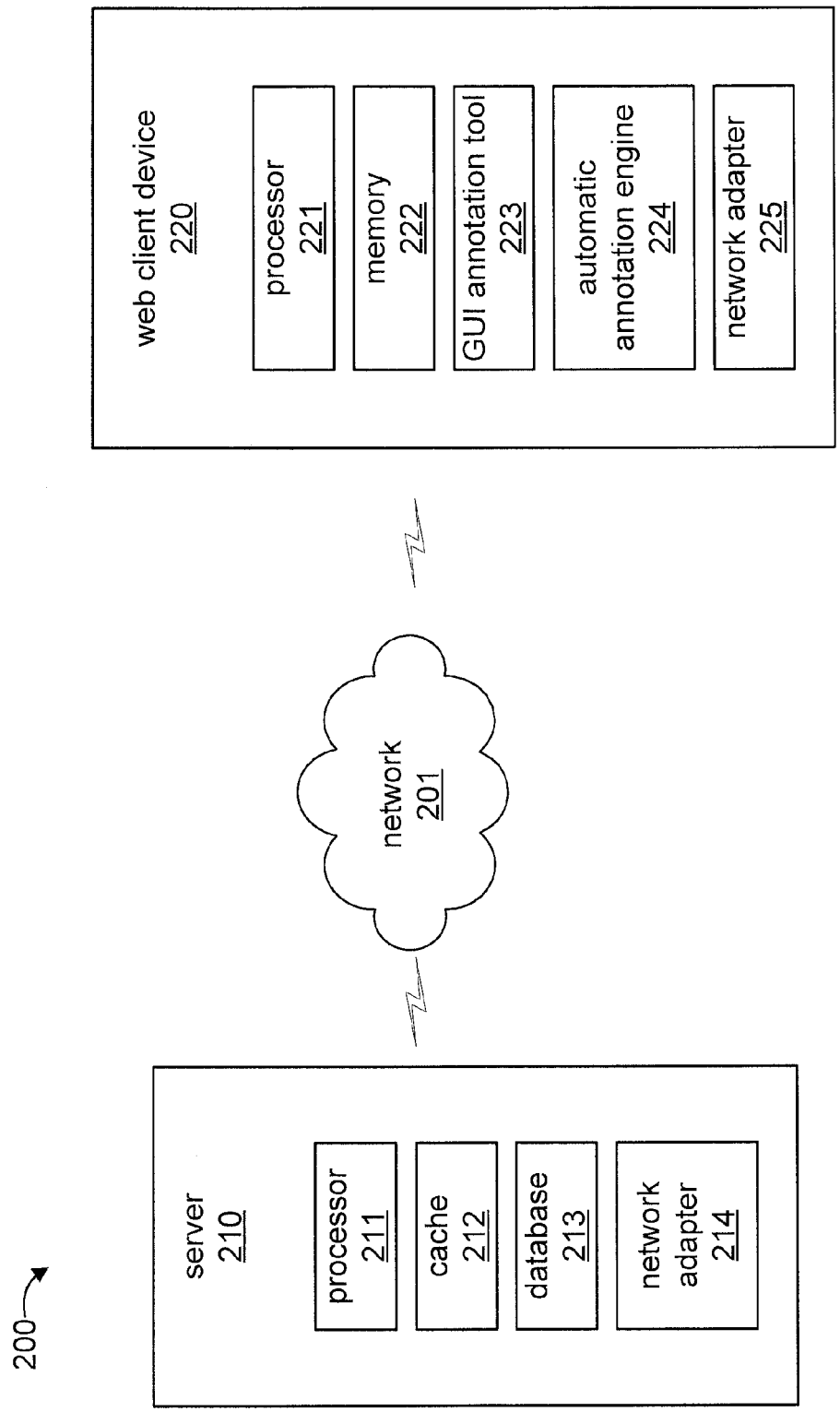
FIG. 2 shows a block diagram of an exemplary environment 200 to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
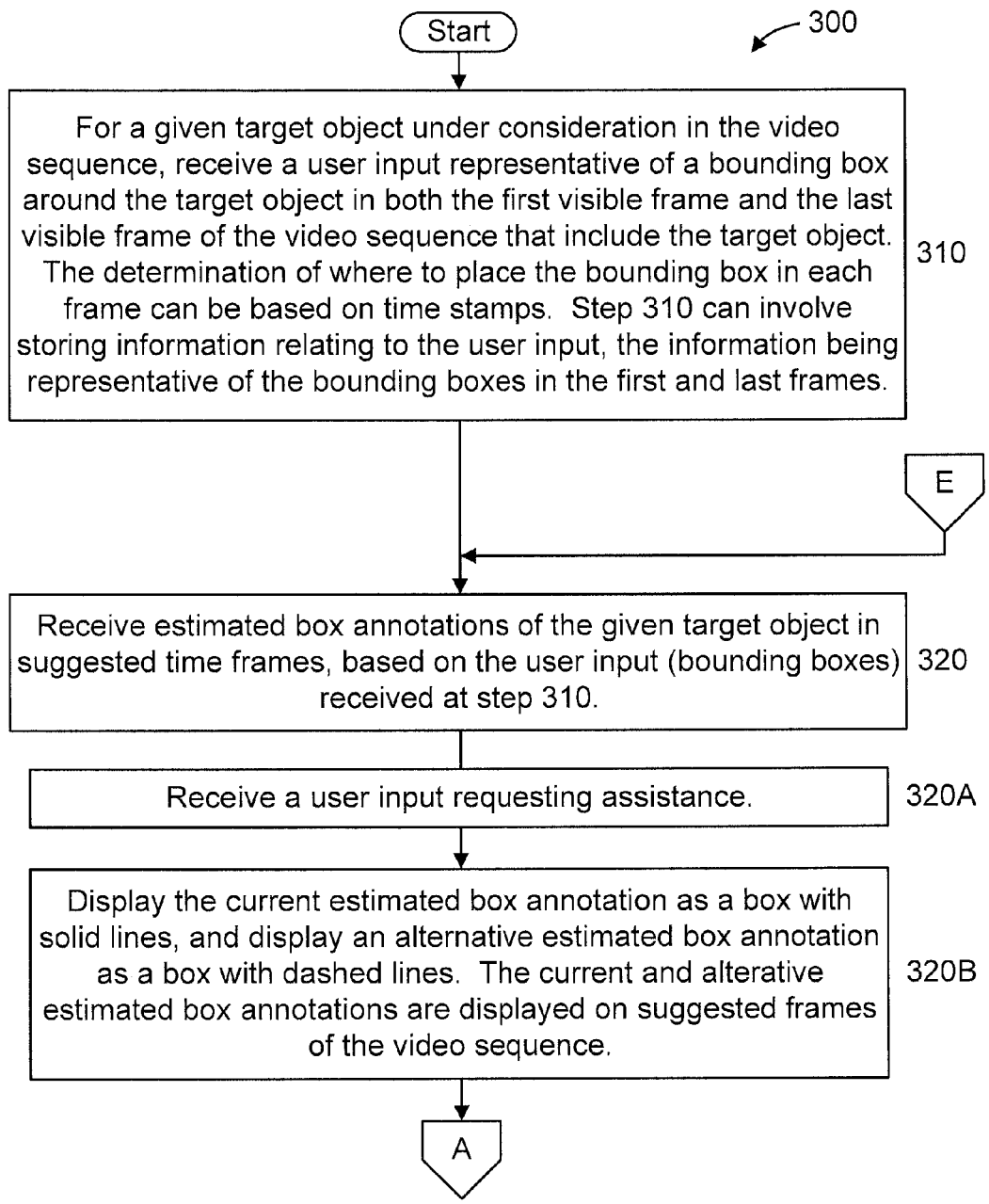
FIGS. 3-5 show a flow diagram of an exemplary method 300 for efficient video annotation with optical flow based estimation and suggestion, in accordance with an embodiment of the present invention.
Figure 4:
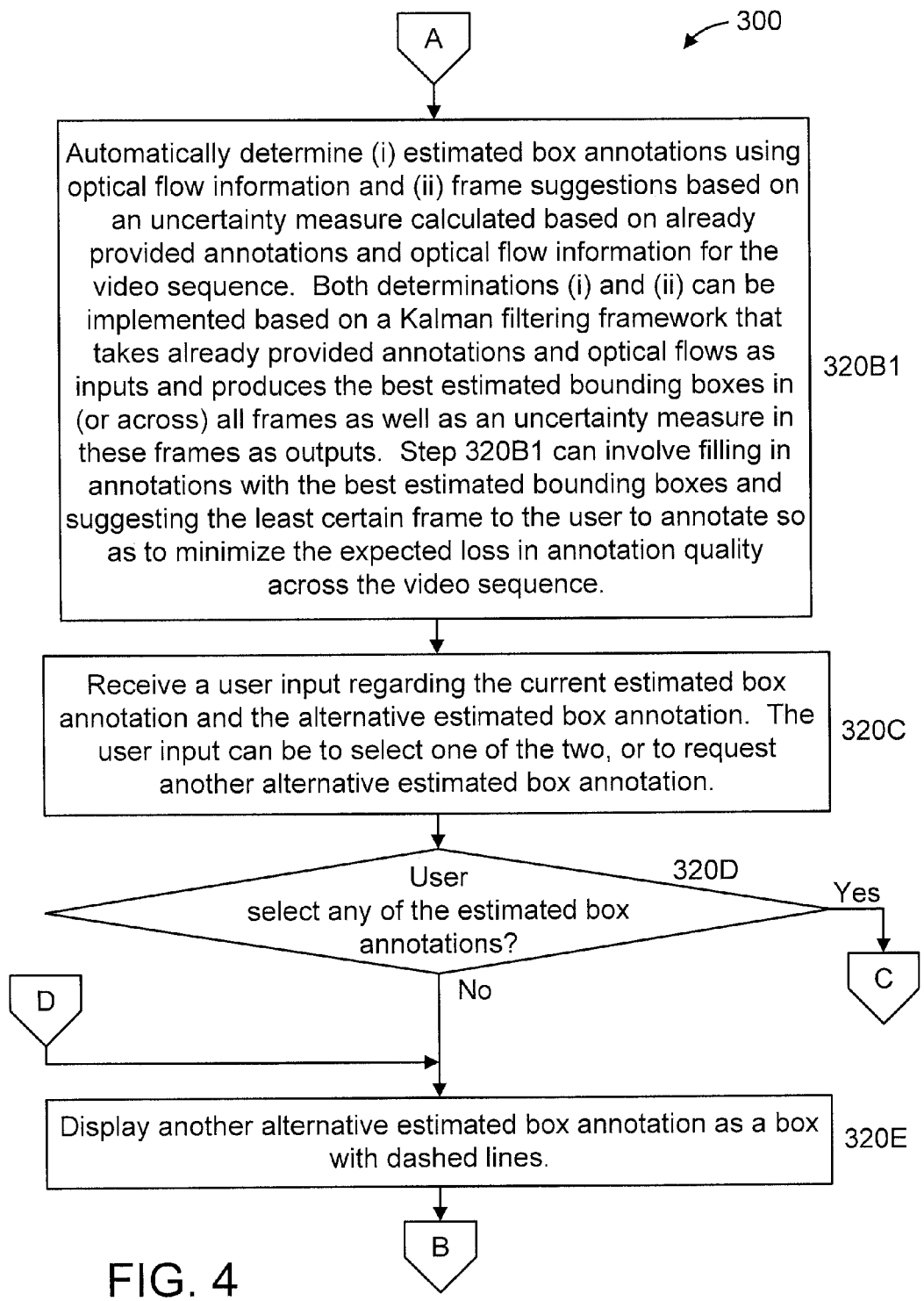
Figure 5:
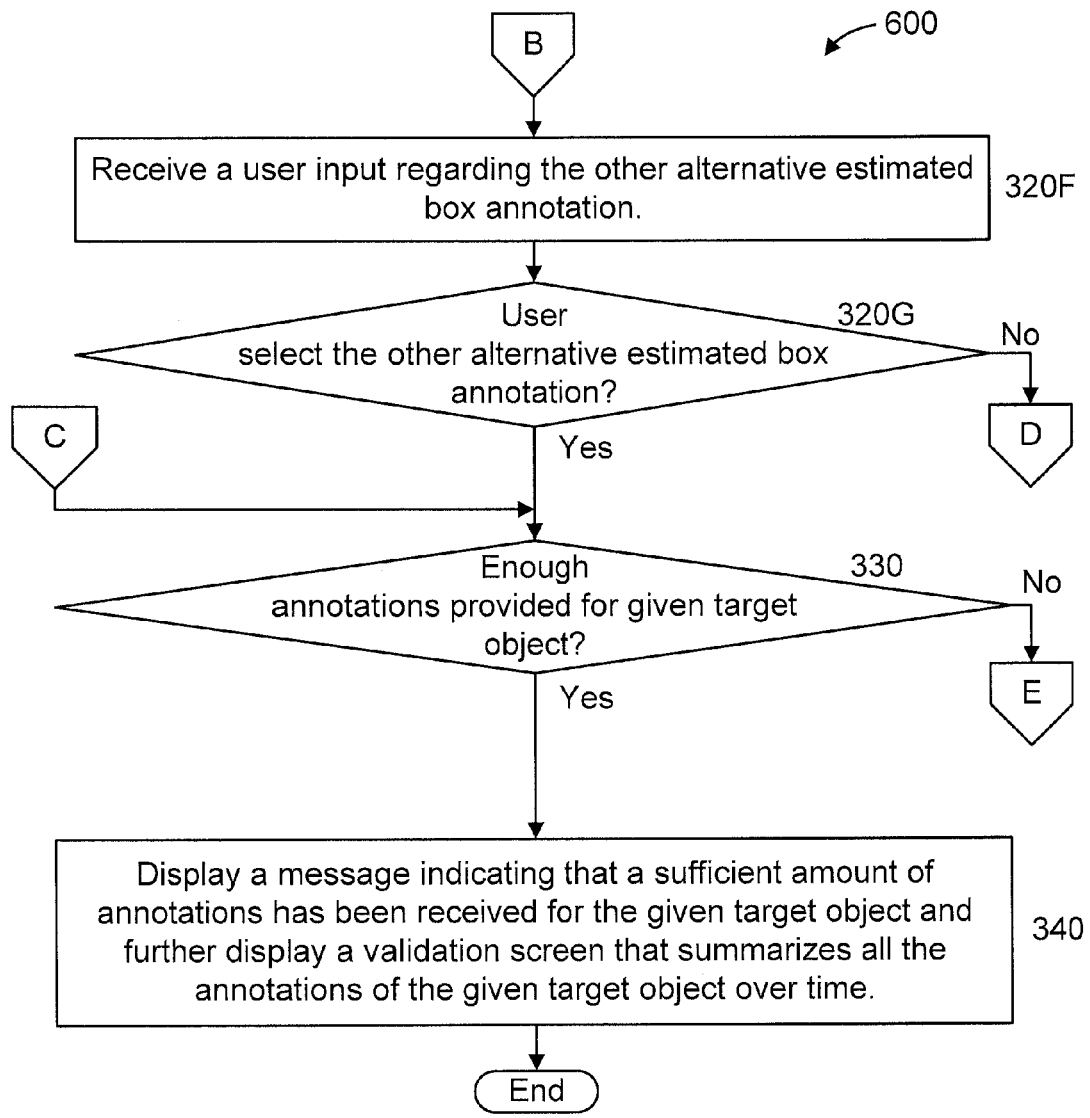

Further, it is to be appreciated that processing system 100 may perform at least part of the method described herein including, for example, at least part of method 300 of FIGS. 3-5. Similarly, part or all of environment 200 may be used to perform at least part of method 300 of FIGS. 3-5.

FIG. 2 shows an exemplary environment 200 to which the present invention can be applied, in accordance with an embodiment of the present invention.

The environment includes a server 210 and a web client device (hereinafter "web client" in short) 220. The web client 220 can be any type of computer processing device capable of video annotation in accordance with the present invention including, but not limited to, servers, desktops, laptops, tablets, smart phones, media playback devices, and so forth.

The server 210 at least includes a processor 211, a cache 212, a database 213, and a network adapter 214.

The web client 220 includes a processor 221, a memory 222, a Graphical User Interface (GUI) annotation tool 223, an automatic annotation engine 224, and a network adapter 225.

A job (a video sequence) can be loaded into the server 210. The server 210 will cache optical flows when loading the job, and store the corresponding images and optical flows into the database 213. Once the data loading is done, users can access the data through the GUI annotation tool 223 in order to annotate the data in an annotation process. The annotation process is described below with respect to FIG. 3.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIGS. 3-5 show a flow diagram of an exemplary method 300 for efficient video annotation of a video sequence with optical flow based estimation and suggestion, in accordance with an embodiment of the present invention. The method 300 can be performed by a computer processing system such as, for example, server 210 in FIG. 2. A user can iterate over the method 300.

At step 310, for a given target object under consideration in the video sequence, receive a user input representative of a bounding box around the target object in both the first visible frame and the last visible frame of the video sequence that include the target object. For example, a user can draw the bounding box, e.g., using a mouse and/or keyboard of the GUI annotation tool 223 of the web client 220 of FIG. 2. In an embodiment, the determination of where to place the bounding box in each frame is based on time stamps. For example, in an embodiment, step 310 can involve navigating through different time stamps of the video to identify the first and last frame of each target object. The user input is received by the server 210 from the web client 210 of FIG. 2. In an embodiment, step 310 can involve storing information relating to the user input, the information being representative of the bounding boxes in the first and last frames.

At step 320, receive estimated box annotations of the given target object in suggested time frames, based on the user input (bounding boxes) received at step 310. The suggested time frames are suggested by the server 210 and indicated to (received by) the web client 220.

In an embodiment, step 320 can include one or more of steps 320A, 320B, 320C, 320D, 320E, 320F, and 320G.

At step 320A, receive a user input requesting assistance. For example, the user input can be received responsive to the user pressing and/or otherwise actuating a "Helpme!" button and/or other predesignated key/button to find the optimal suggested frame(s) of annotation and move to that optimal time frame(s).

At step 320B, display the current estimated (and suggested) box annotation as a box with solid lines, and display an alternative estimated (and suggested) box annotation as a box with dashed lines. The current and alterative estimated box annotations are displayed on suggested frames of the video sequence.

In an embodiment, step 320B includes step 320B1.

At step 320B1, automatically determine (i) estimated box annotations using optical flow information and (ii) frame suggestions based on an uncertainty measure calculated based on already provided annotations and optical flow information for the video sequence. Both of the determinations (i) and (ii) can be implemented based on a Kalman filtering framework that takes already provided annotations (e.g., in only few frames, e.g., a sparse set of already provided annotations) and optical flows as inputs and produces the best estimated bounding boxes in (or across) all frames as well as an uncertainty measure in these frames as outputs. The present invention can fill in the annotations with the best estimated bounding boxes and suggest the least certain frame to the user to annotate so as to minimize the expected loss in annotation quality across the video sequence.

At step 320C, receive a user input regarding the current estimated box annotation and the alternative estimated box annotation. The user input can be to select one of the two, or to request another alternative estimated box annotation. For example, if the current estimated box annotation is acceptable, then the user can simply press the "g" key (indicative of "good" or "acceptable", or some other pre-designated key) on the keyboard to switch to the alternative. Otherwise, if the alternative estimated box annotation is acceptable, then the user can simply press the "s" key (indicative of "switching" to the alternate estimated box annotation, or some other pre-designated key) on the keyboard to switch to the alternative estimated box annotation. Still otherwise, the user can simply press the "a" key (indicative of requesting another alternative, or some other pre-designated key) to switch to another alternative estimated box annotation.

At step 320D, determine whether the user selected any of the current estimated box annotation or the alternative estimated box annotation (based on the user input received at step 320C). If so, then proceed to step 330. Otherwise, proceed to step 320E.

At step 320E, display another alternative estimated box annotation as a box with dashed lines.

At step 320F, receive a user input regarding the other alternative estimated box annotation. For example, if the alternative is good, then the user can simply press the "s" key (or some other pre-designated key) on the keyboard to select the other alternative estimated box annotation.

At step 320G, determine whether the user selected the other alternative estimated box annotation (based on the user input received at step 320F). If so, then proceed to step 330. Otherwise, return to step 330E.

At step 330, determine whether enough annotations have been provided for a given one of the target objects. If so, then proceed to step 340. Otherwise, return to step 320 to add further annotations to the suggested frames and/or other (newly) suggested frames. Otherwise, return to step 320 to process the next given target object. The determination can be based on a threshold amount of annotations, an expected amount of annotations, historical annotations, and so forth.

At step 340, display a message indicating that a sufficient amount of annotations has been received for the given target object and further display a validation screen that summarizes all the annotations of the given target object over time. Then return to step 320A to process the next target object under consideration in the video sequence.

A description will now be given regarding specific competitive/commercial values of the solution achieved by the present invention.

For example, the present invention can reduce both the cost and time of the annotation process and also can help a user obtain high quality annotations with a minimal amount of user training. Since the system automatically generates unlabeled bounding boxes and suggest the best frames to be annotated, it can significantly reduce the required number of manual interactions by the user. In addition, since the present invention also provides a guidance (optimal frame to be annotated) to the user, better quality of the annotations is obtained.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for video annotation of a video sequence that includes a plurality of frames, the method comprising:
    storing, by a computer, information representative of a bounding box around a given target object in the video sequence in both a first frame and a last frame of the video sequence that include the target object;
    generating, by the computer based on the information, estimated box annotations of the given target object in suggested frames from among the plurality of frames, the suggested frames being determined based on an annotation uncertainty measure calculated using a set of already provided annotations for at least some of the plurality of frames together with optical flow information for the video sequence; and
    displaying, by the computer, various ones of the estimated box annotations of the given target object in the suggested frames.

2. The computer-implemented method of claim 1, wherein the video sequence comprises a plurality of frames including the first frame and the last frame, and the method further comprises identifying the first frame and the last frame based on time stamps.

3. The computer-implemented method of claim 1, further comprising receiving a user input requesting assistance to determine the suggested frames optimal for annotation from among the plurality of frames.

4. The computer-implemented method of claim 1, wherein said generating step generates the estimated box annotations of the given target in the suggested frames to include a current estimated box annotation and at least one alternate estimated box annotation which are subsequently displayed to a user in said displaying step for user selection.

5. The computer-implemented method of claim 4, wherein each of the current estimated box annotation and the at least one alternate estimated box annotation are displayed to be visually distinct from each other.

6. The computer-implemented method of claim 4, further comprising receiving a user input to one of (i) select the current estimated box annotation, (ii) select the alternative estimated box annotation, or (iii) request another alternative estimated box annotation.

7. The computer-implemented method of claim 1, wherein the set of already provided annotations is a sparse set.

8. The computer-implemented method of claim 1, wherein the estimated box annotations of the given target object are generated further based on the optical flow information for the video sequence.

9. The computer-implemented method of claim 1, wherein the estimated box annotations of the given target object are generated further based on Kalman filtering applied to the video sequence.

10. The computer-implemented method of claim 9, wherein the Kalman filtering performs filtering using the set of already provided annotations and the optical flow information to output (i) a set of best estimated bounding boxes across each of the plurality of frames and (2) the annotation uncertainty measure for any of the plurality of frames that include one of the best estimated bounding boxes from the set.

11. The computer-implemented method of claim 10, wherein the set of best estimated bounding boxes is determined so as to minimize an expected loss in annotation quality across the video sequence.

12. The computer-implemented method of claim 10, wherein one of the suggested frames is determined by as a least certain frame regarding the annotation uncertainty measure from among the plurality of frames so as to minimize an expected loss in annotation quality across the video sequence.

13. The computer-implemented method of claim 1, wherein the suggested frames consist of a set of least-most certain frames based on the annotation certainty measure.

14. The computer-implemented method of claim 1, further comprising visually displaying the annotation uncertainty measure for each of the plurality of frames.

15. The computer-implemented method of claim 1, wherein the suggested frames are determined using Kalman filtering.

16. The computer-implemented method of claim 1, wherein the various ones of the estimated box annotations that are displayed are determined based on one or more user inputs.

17. The computer-implemented method of claim 1, further comprising:
    displaying a message that a sufficient amount of annotations has been received for the given target object; and
    displaying a validation screen that summarizes all of the annotations of the given target over time.

18. A computer program product for video annotation of a video sequence that includes a plurality of frames, the computer program product comprising a non-transitory computer readable storage medium having program instructions embodied therewith, the program instructions executable by a computer to cause the computer to perform a method comprising:
    storing information representative of a bounding box around a given target object in the video sequence in both a first frame and a last frame of the video sequence that include the target object;
    generating, based on the information, estimated box annotations of the given target object in suggested frames from among the plurality of frames, the suggested frames being determined based on an annotation uncertainty measure calculated using a set of already provided annotations for at least some of the plurality of frames together with optical flow information for the video sequence; and
    displaying various ones of the estimated box annotations of the given target object in the suggested frames.

19. The computer program product of claim 18, wherein the estimated box annotations of the given target object are generated further based on Kalman filtering applied to the video sequence.

20. A computer processing system for video annotation of a video sequence that includes a plurality of frames, the computer processing system comprising:
    a memory configured to store information representative of a bounding box around a given target object in the video sequence in both a first frame and a last frame of the video sequence that include the target object;
    a processor configured to generate, based on the information, estimated box annotations of the given target object in suggested frames from among the plurality of frames, the suggested frames being determined based on an annotation uncertainty measure calculated using a set of already provided annotations for at least some of the plurality of frames together with optical flow information for the video sequence; and
    a display device configured to display various ones of the estimated box annotations of the given target object in the suggested frames.

* * * * *